3,184,338
FORMATION OF NEGATIVE ELECTRODES
Gustav A. Mueller, St. Paul, Minn., assignor to Union Carbide Corporation, a corporation of New York
No Drawing. Filed Jan. 31, 1962, Ser. No. 170,258
4 Claims. (Cl. 136—75)

This invention relates to the formation of negative electrodes for use in alkaline cells, and more particularly, it relates to the formation of negative electrodes which employ cadmium hydroxide as the active material.

In the prior art, negative electrodes designed for use in nickel-cadmium cells are generally prepared by impregnating a sintered nickel plaque with a suitable cadmium salt solution, such as a molten or saturated solution of cadmium nitrate, which is subsequently converted to cadmium hydroxide by electro-chemical polarization or precipitation in an alkaline electrolyte. An alternative process calls for the thermal decomposition of a similarly impregnated cadmium salt to cadmium oxide which is then subsequently converted to cadmium hydroxide in a hot caustic bath of sodium hydroxide or potassium hydroxide. In both of these methods, it is necessary for the impregnation and conversion procedure to be repeated a number of times, usually 4 or 5, until the required weight of active material has been deposited in the interstices of the sintered plaque.

The sintered nickel plaque used as the supporting and conductive structure of the electrode is expensive and contributes significantly to the cost of producing such electrodes. Another disadvantage in these processes is the high cost of the cadmium salt of which the impregnating solution is composed.

U.S. patent application, Serial No. 83,145, filed January 17, 1961, of which the applicant in the instant application is one of the joint inventors, discloses a process whereby these disadvantages of the prior art processes may be avoided. The disclosed process comprises immersing a suitable conductive metal matrix in an aqueous solution of cadmium nitrate in which one or more electrodes made of cadmium metal are also immersed. Electro-deposition is carried out using the cadmium electrode as the anode and the conductive metal matrix as the cathode. Nitric acid is added to the solution to maintain a pH level between about 1.0 and 1.5. The deposit which forms in the interstices of the conductive metal matrix is a complex of cadmium hydroxide and nitrogenous compounds. A white deposit which forms at the cadmium anode is a complex of cadmium oxide and cadmium nitrate. This complex is redissolved by the nitric acid in the bath so that it exists only temporarily. Thus, it is not required to make additions of expensive cadmium nitrate salt to the solution, since the cadmium metal anode or anodes is the source of the cadmium which plates in the interstices of the cathode, rather than the cadmium nitrate salt.

Many conductive materials other than sintered nickel plaques have been found to be perfectly satisfactory for use in the above-disclosed method. Such matrices include nickel mesh screen, expanded nickel metal, perforated nickel plate, punctured nickel foil, felted nickel metal fiber, porous nickel metal, and similar structures which are nickel plated rather than pure nickel.

It has been the practice to place the conductive metal matrix, the interstices of which are filled with the complex of cadmium hydroxide and nitrogenous compounds as outlined above, in condition for use as an electrode by a formation process in the cell in which it is to be used. The process consists of charging and discharging the cell and then replacing the electrolyte used for that purpose with fresh electrolyte prior to sealing the cell.

The principal object of this invention is to provide a process for the formation of a finished electrode from a negative electrode stock comprising a conductive metal matrix the interstices of which are filled with an electro-deposited complex of cadmium hydroxide and nitrogenous compounds, which process will improve the quality of the electrode.

Broadly stated, the process comprises the steps of electrochemically charging the cadmium hydroxide in the complex which has been deposited in the interstices of a suitable conductive metal matrix to spongy metallic cadmium, applying pressure to the spongy metallic cadmium containing metal matrix to reduce it to a desired thickness, and discharging the spongy cadmium in the interstices of the matrix to cadimum hydroxide. The thus prepared electrode is subsequently washed to remove the nitrogenous compounds, and dried.

In the preferred embodiment of the invention, the charging of the cadmium hydroxide in the complex in the interstices of the conductive matrix to spongy cadmium is carried out in a 30% potassium hydroxide aqueous electrolytic bath using the conductive matrix as a cathode and a nickel or other inert electrode as an anode. The preferred current density is from .03 amp/sq. in. to 6 amps/sq. in. of matrix area. The size reduction is preferably accomplished by pressure rolling by passing the still wet conductive matrix through smooth nickel or stainless steel rollers in order to compress the matrix to the desired thickness. The pressure required for compressing are functionally related to the thickness desired. The discharge of the rolled spongy metallic cadmium containing matrix to cadmium hydroxide is also preferably carried out in a 30% potassium hydroxide aqueous electrolytic bath with the conductive matrix as the anode with the same or a slightly lower current density per matrix area than is used to charge the cadmium hydroxide in the complex to cadmium metal. The washing is suitably done in hot tap water for 4 or 5 minutes to remove the nitrogenous compounds which are chemically detached from the complex in the conductive matrix by the charging and discharging process.

A specific example of the invention is as follows:

A matrix made of a 40 x 40 nickel mesh of .007 inch wire which was 1.131 inches by 7.5 inches was made the cathode in a plating bath of a 50 percent by weight cadmium nitrate aqueous solution which was maintained at a temperature of about 20° C. A plurality of cadmium metal rods were employed as the anode. Electrodeposition of the complex of cadmium hydroxide and nitrogenous compounds in the interstices of the matrix was carried out with a 10 ampere current for 22 minutes. After the electrodeposition, the matrix had a thickness of approximately 0.06 inch. During the electrodeposition, nitric acid was added to the plating bath in order to maintain the pH thereof between 1.0 and 1.5. The deposited cadmium hydroxide in the complex was charged to spongy metallic cadmium in a 30% potassium hydroxide electrolytic bath with the matrix as the cathode and nickel electrode as the anode with a charging current of 10 amperes for 30 minutes. The spongy metallic cadmium containing matrix was then passed through smooth nickel rollers under a pressure of about 500 pounds/sq. in. which reduced the thickness of the matrix to about 0.02 inch. The spongy metallic cadmium in the rolled matrix was then discharged to cadmium hydroxide under the same conditions as it was charged. Finally, the thus treated matrix which is now a formed electrode was washed with tap water for about four minutes to remove the nitrogenous compounds, and air dried.

In order to test the effectiveness of the formation process of the invention, electrodes prepared as above were compared with electrodes which were similarly prepared except that in one instance the electrodes were not rolled and in another they were rolled prior to the formation cycling. The electrode of the invention had the same discharge time through 5 amps after the fifth cycle as it had after the first, namely 30 minutes. The electrodes which were not rolled, discharged 50% faster after the fifth cycle and in addition some of the active material spalled. The electrodes which were rolled prior to the formation cycling could not be tested for the adhesion between the active material and the nickel mesh was destroyed.

The electrodes of the invention also showed marked improvement over conventional cadmium sintered plaque electrodes. With respect to self discharge, the electrodes of the invention experienced a 50% capacity loss after 120 days, while conventional sintered plaque electrodes of the same size suffered a 100% capacity loss in the same time.

The electrode of the invention also takes a charge better than conventional sintered plaque electrodes. This is shown in the table below.

Table

| Charging Current, Milliamps | Control | Invention |
|---|---|---|
| | End of Charge Voltage, Volts | |
| 60 | 1.45 | 1.71 |
| 250 | 1.54 | 1.79 |
| 1,000 | 1.68 | 1.89 |

The improved performance of cadmium electrodes formed according to the teaching of the invention is attributed to the increased physical strength of the active deposit on the matrix due to the rolling which minimizes sluffing off of active materials, and the charge-discharge formation cycling process which releases the nitrogenous compounds. The action of nitrogenous compounds such as nitrate or nitrite in an electrode structure is well known in the art to cause self-discharge of the electrode and loss of capacity on shelf storage.

I claim:

1. In a formation process for converting negative electrode stock consisting essentially of a conductive metal matrix the interstices of which are filled with an electrodeposited complex of cadmium hydroxide and nitrogenous compounds into a finished electrode ready for use in a galvanic cell, the improvement consisting essentially of the following order of steps; electrochemically charging said cadmium hydroxide in said complex to form spongy metallic cadmium, reducing the thickness of said conductive metal matrix to the desired size by the application of pressure, discharging said spongy metallic cadmium to form cadmium hydroxide, washing the thus formed electrode to remove said nitrogenous compounds, and drying said electrode.

2. In a formation process for converting negative electrode stock consisting essentially of a conductive metal matrix the interstices of which are filled with an electrodeposited complex of cadmium hydroxide and nitrogenous compounds into a finished electrode ready for use in a galvanic cell, the improvement consisting essentially of the following order of steps; electrochemically charging said cadmium hydroxide in said complex to form spongy metallic cadmium, press rolling said conductive metal matrix under pressure to reduce the thickness of said matrix to the desired size, discharging said spongy metallic cadmium to form cadmium hydroxide, water washing the thus formed electrode to remove said nitrogenous compounds, and air drying said electrode.

3. The improved process of claim 2 wherein said charging and said discharging is carried out in about a 30% potassium hydroxide aqueous electrolytic bath using a current density of from about .03 amp/sq. in. to 6 amps/sq. in. of matrix area.

4. The improved process of claim 3 wherein the thickness of said matrix is reduced to about 33% of its original thickness by said pressure rolling.

References Cited by the Examiner

UNITED STATES PATENTS 3,009,980   11/61   Corren et al. _____ 136—24

OTHER REFERENCES

Hauel: Transactions of the Electrochemical Society, vol. 76, 1939, pages 435–452.

Fleischer: Transactions of the Electrochemical Society, vol. 94, 1948, page 295.

JOHN H. MACK, *Primary Examiner.*

JOSEPH REBOLD, MURRAY TILLMAN, *Examiners.*